March 16, 1965   A. M. FEIBUSH ETAL   3,173,610
DEW POINT DETECTOR AND CONTROLLER
Filed Oct. 10, 1962   2 Sheets-Sheet 2
Fig. 3.
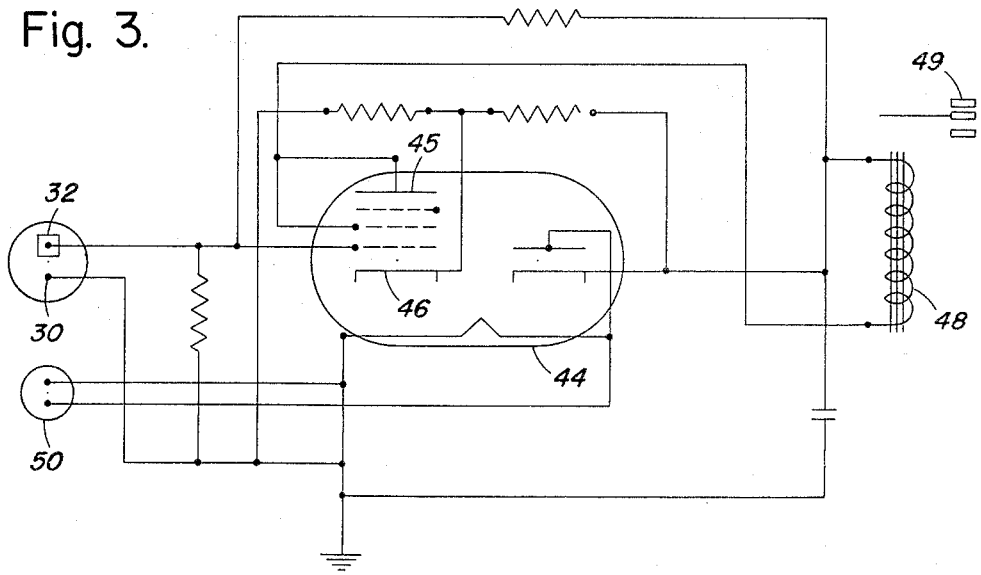
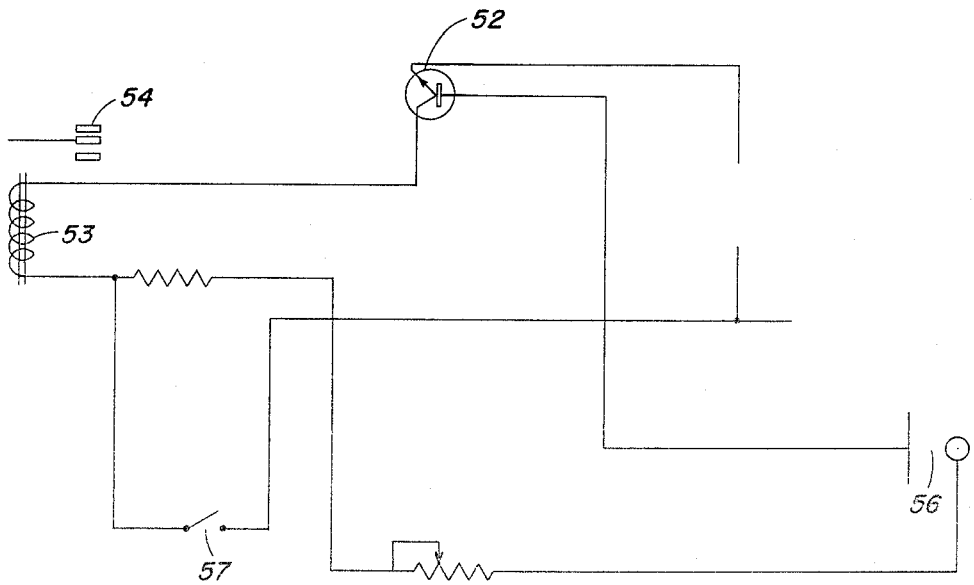
Fig. 4.
INVENTORS
Arthur M. Feibush
Edward Studley
BY
ATTORNEY

United States Patent Office 3,173,610
Patented Mar. 16, 1965

3,173,610
DEW POINT DETECTOR AND CONTROLLER
Arthur M. Feibush, Westfield, and Edward Studley, North Plainfield, N.J., assignors to American Radiator & Standard Sanitary Corporation, New York, N.Y., a corporation of Delaware
Filed Oct. 10, 1962, Ser. No. 229,628
15 Claims. (Cl. 236—44)

This invention relates to a method of and apparatus for detecting and controlling the condensable constituents of gases, or the humidity of air, and is particularly directed to a device in which the point of condensation of the gases, or the dew point of the air is used as a means for operating a control or other suitable device.

An object of the invention is to provide a simple, compact mechanism for detecting the condensable content of a gas, or the humidity of the air and for automatically energizing or shutting off a device in order to obtain the condensable constituent or humidity desired.

A further feature of the invention is that when condensate collected in a tube or other carrier exceeds a predetermined level, it is utilized as a means for controlling the operation of a relay which controls a dehumidifier, a humidifier, or other suitable type of device.

Another feature is that the gas or air to be controlled is sampled continuously and is cooled to the desired temperature in a uniform manner, so that temperature gradients are negligible.

Another feature is that the temperature of the cooled gas or air itself and not the temperature of a cooled surface in contact with the gas or air, is used to generate control information for proper cooling regulation.

Another object is to provide an apparatus in which a plurality of thermoelectric elements energized by a D.C. power source is utilized as a means for maintaining constant temperature in order to determine the humidity in the air or the moisture content of the gas, electrical control means being provided for energizing a dehumidifying device in order to control the moisture contact or humidity when the moisture contact or humidity exceeds a predetermined maximum, or for energizing a humidifying device when the humidity is below a predetermined minimum.

Another feature is that a temperature control device is used in combination with a thermistor or other type of temperature sensing device to control the operating temperature of the thermoelectric elements, thereby establishing uniform temperature in the gas or air to be controlled.

The accompanying drawings, illustrative of one embodiment of the invention, and several modifications thereof, together with the description of their construction and the method of operation, control and utilization thereof, will serve to clarify further objects and advantages of the invention.

FIGURE 3 is a schematic wiring diagram of one embodiment of the moisture sensing circuit, shown in block form in FIGURE 1, an amplifier tube being incorporated in the circuit.

FIGURE 4 is a schematic diagram, similar to FIGURE 3, of a modification of the moisture sensing circuit shown in FIGURE 3, a transistor being substituted for the amplifier tube shown in FIGURE 3.

Figure 1:
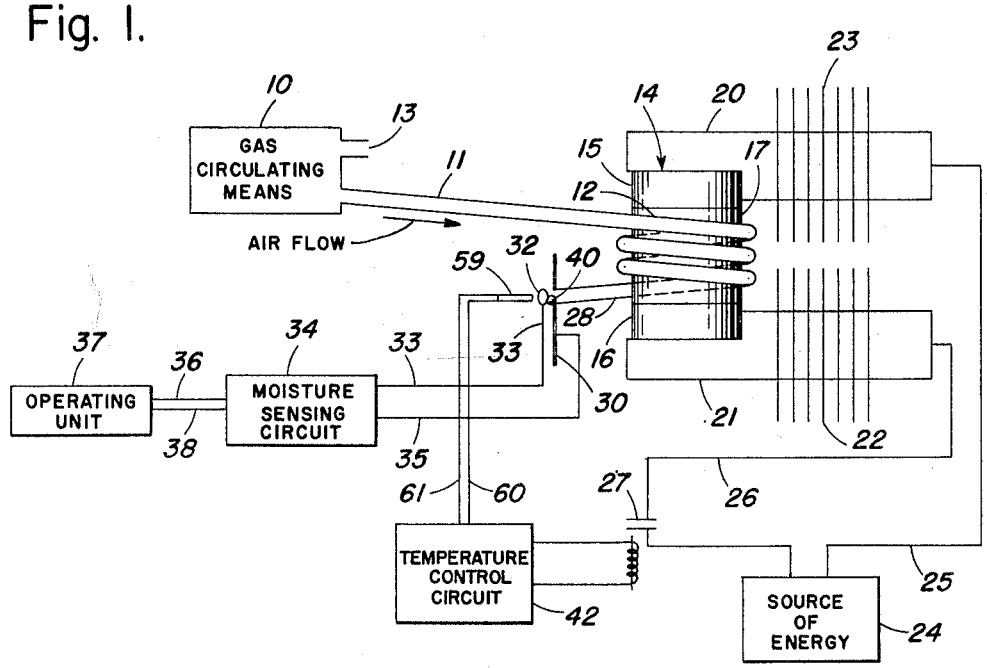
FIGURE 1 is a schematic diagram of one embodiment of the apparatus employing thermoelectric elements, and a switch actuating means which is used for controlling the operation of a humidifier, dehumidifier or other apparatus.

It will be understood that the following description of the construction and the method of operation, control and utilization of a condensable constituent detection and control apparatus is intended as explanatory of the invention and not restrictive thereof. In the drawings, the same reference numerals designate the same parts throughout the various views except where otherwise indicated.

One embodiment of the invention shown in FIGURE 1 comprises a gas pump 10, or other gas or air circulating device which circulates gases, mixtures of gases, or air the moisture content of which is to be detected and controlled, through a tubular conduit 11, which is integral with or directly connected to a tubular coil 12 surrounding a gas cooling mechanism 14 as shown in FIGURE 1. The gas intake 13 of the circulating pump is directly connected to the medium, the condensable constituent content of which is to be controlled or to the atmosphere. The apparatus and the method may be used with equal facility either for condensable gases or mixtures of gases having moisture or other condensable constituents contained therein for air.

Suitable means are provided for cooling the gas. Such gas cooling means may comprise a pair of thermoelectric elements 15 and 16, the inner end surfaces of which are bonded to a central cylinder 17 or other heat conducting member, made of brass, or other thermally conductive material. The central cylinder 17 is used to maintain the tubular coil 12 at a predetermined temperature and conducts any excess heat through the thermoelectric elements into the heat sinks 20 and 21 which radiate the excess heat through fins 22 and 23.

In place of the heat conducting cylinder 17, a tubular or cylindrical container filled with a thermal transmitting liquid may be employed. The primary purpose of the cylinder 17 being to maintain the tubular coil 12 at a predetermined desired temperature and to thereby lower the temperature of the gas or air passing through the tubular coil 12 if necessary to this predetermined temperature.

The temperature of the central cylinder 17 is somewhat lower than the desired operating temperature of the gas or air to compensate for heat transmission losses between the coil and the cylinder and through the tubular coil 12.

Each of the thermoelectric elements 15, 16, shown in FIGURE 1 consists of a thin cylinder, disc or other configuration made of a semi-conductor material, the primary character of which is that when a D.C. current is transmitted through the disc or cylinder it generates heat through one surface of the disc, the surface extending beyond the central cylinder 17 in FIGURE 1, and extracts heat from the central cylinder through the surface of the disc abutting the flat upper or lower surface of the central cylinder 17, to which the thermoelectric elements 15, 16 are attached.

The type of semi-conductor material which may be employed for this purpose is generally known as bismuth telluride thermoelectric units, and is commercially available in cylindrical form, and of predetermined height, which resembles thick buttons or discs, such as those shown in FIGURE 1. The semiconductor material can also be composed of selenium telluride or lead telluride or other suitable semiconductor crystals which have been doped by the diffusion thereinto of impurities of respectively different polarities to form a P-type semi-conductor and an N-type semiconductor having the characteristics of a high thermoelectric output when thermoelectric junctions are made between dissimilar ones of such substances, which will be "hot" or "cold" depending upon the direction of the flow of current when connected to a source of direct current.

The surfaces of the discs adjoining the central cylinder are properly prepared and firmly bonded to the central cylinder to assure maximum heat and electrical conductivity therethrough.

The surface of each of the thermoelectric elements 15, 16 opposite that attached to the central cylinder, each has a heat sink 20, 21 fixedly attached or bonded thereto, each of the heat sinks having a plurality of thin fins 22, 23, integral therewith or attached thereto, the fins being adapted to dissipate the heat generated in the outer portion of the thermoelectric elements, and transmitted to the heat sinks 20, 21, the heat being radiated to the gas or air surrounding the heat sinks.

The fins 22, 23 may either be radial or circumferential, when the heat sink 20, 21 is of cylindrical form. The fins may extend outward in one direction substantially perpendicular to the face of the heat sink, where the heat sink is flat or of rectangular cross-sectional form.

D.C. power for energizing the thermoelectric elements is furnished by a D.C. power supply source 24. The current from the D.C. power source 24 is transmitted through a conductor 25 to one end of one of the heat sinks 20, from which it is transmitted to the thermoelectric element 15 to which the heat sink is attached, thence through the central cylinder 17, to the second thermoelectric element 16 to the second heat sink 21, which is connected by a conductor 26 through a relay 27, which forms part of a temperature control circuit 42, which is shown diagrammatically in FIGURE 1, and will hereinafter be described in greater detail, thence back to the power supply source 24.

An outlet section 28 is integral with one end of the tubular coil 12, the outlet section extending outward beyond the end of the tubular coil 12. An end plate 30 made of metal, or other suitable electrically conductive material is attached to the outer end of the outlet section 28 of the tubular coil.

Figure 2:
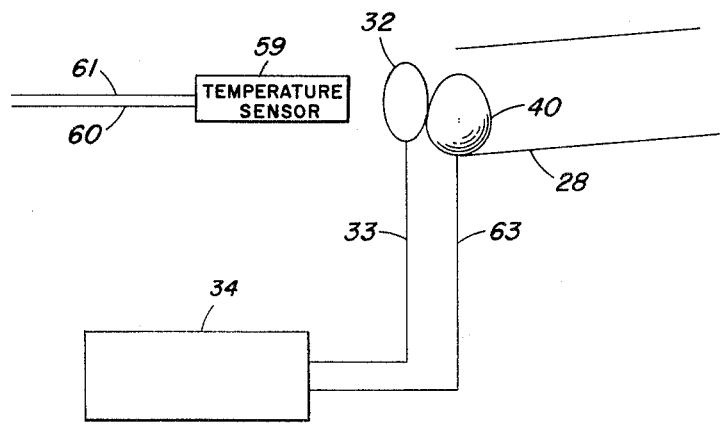
FIGURE 2 is an enlarged schematic diagram, similar to FIGURE 1 of a modification of the condensate controlled switch actuating mechanism shown in FIGURE 1.

A loop contact 32, such as that shown in FIGURE 2, is located a short distance from the end of the outlet section 28 of the tubular coil, a gap being normally formed between the loop contact 32, and the end of the outlet section 28 of the tubular coil.

The loop contact 32 is connected by a conductor 33 to a moisture sensing circuit 34 which is shown in block diagram form in FIGURE 1, and shown in greater detail in FIGURES 3 and 4. The moisture sensing circuit 34 is connected by a conductor 35 to the end plate 30 attached to the open end of the outlet section 28 of the coil.

One embodiment of the moisture sensing circuit 34 is shown in FIGURE 3. This circuit is controlled by the switching mechanism shown in FIGURE 1, in which the circuit is closed by a drop of condensate 40, which lodges between the plate 30 attached to the outlet end 28 of the coil and the loop contact 32 located near the plate 30, as hereinbefore described. When the gap between the loop contact 32 and the plate 30 is bridged by the drop of water, or other condensate 40, the impedance between these two elements is reduced. This reduction in impedance results in a change in the grid bias in an amplifier tube 44. The magnitude of the current flowing between the anode 45 and the cathode 46 of the amplifier tube 44 is also changed. This change in the conditions within the amplifier tube 44 results, after amplification, in a change in the current transmitted to the coil 48 of a relay 49, which controls an operating unit in the manner hereinafter described, thereby causing the relay 49 to operate.

Depending upon the type of action desired, the relay 49 may be connected so that it is normally open, or normally closed. The 110 volt A.C. power required to operate the moisture detector circuit is obtained through a plug 50 or other type of connector shown in FIGURE 3, independently of the power supply 24, shown in FIGURE 1. The relay 49 may be connected to one or more humidifiers, dehumidifiers, air conditioning equipment or other type of apparatus depending upon the requirements of a particular installation or application.

FIGURE 4 shows an alternate moisture detecting circuit, which is similar to that shown in FIGURE 3. The primary difference between these two circuits is that a solid state device, such as a transistor 52 is substituted in place of the amplifier tube 44 shown in FIGURE 3, the transistor 52 functioning as an amplifier in the same manner as the amplifier tube 44, shown in FIGURE 3. This circuit can be operated from a dry cell or from standard line current after proper transformation and rectification to obtain 22½ volt D.C. or other voltage required.

The coil 53 of a relay 54 shown in FIGURE 4, is connected to the transistor amplifier 52, the relay functioning in substantially the same manner as that shown in FIGURE 3, and hereinbefore described.

A moisture sensing element 56 is connected to the transistor 52 and the coil 53 of the relay 54 in the manner shown in FIGURE 4. Suitable resistances are connected between the conductors, which connect the moisture sensing element 56 to the coil 53 of the relay. A switch 57 of suitable type is inserted between the wires connecting the voltage source to the coil 53 of the relay to enable the operator to manually shut off the relay of the moisture sensing circuit and therefore the operator unit controlled thereby when desired.

In all other respects, the operation of the moisture sensing circuit shown in FIGURE 4 is substantially the same as that shown in FIGURE 3, and hereinbefore described, except for the type of amplification employed.

A similar moisture sensing element would be incorporated into the amplifier tube controlled moisture sensing circuit shown in FIGURE 3. Similarly, some type of switching device may be incorporated into the circuit shown in FIGURE 3, in the same manner as that shown in FIGURE 4 to enable the operator to manually shut off the operation of the circuit.

Both the moisture sensing circuit shown in FIGURE 3, and that shown in FIGURE 4 are sufficiently sensitive so that the introduction of a drop of distilled water, between the loop contact 32 and the end plate 30 shown in FIGURES 1 and 2, will cause the circuits to operate their respective relays, thereby energizing the operator in the manner hereinbefore described.

The relay of the moisture sensing circuit 34 such as those shown in FIGURES 3 and 4 can be electrically connected by a conductor 36 to a humidifier, a dehumidifier, an air conditioner, or other type of operating unit 37, as shown schematically in FIGURE 1.

A conductor 38 connects the humidifier, dehumidifier unit or other operating unit 37 to the water sensing circuit 34. The water sensing circuit 34 is connected by a conductor 35 to the end plate 30 attached to the outlet end of the tubular coil 12.

When the gas or air, the conductive condensable fluid content, or humidity of which is to be measured and controlled, passes through the gas tube 11 to the tubular gas coil 12, and the conductive condensable fluid content or the humidity of the gas or air rises above a predetermined percentage, the dew point or required humidity level of the gas or air is reached as it passes through the tube 11 and the coil 12, in which the gas or air is cooled by the thermoelectric elements or other suitable means, a portion of the conductive condensible fluid or moisture in the gas or air condenses on the inner surface of the tube 11 and the tubular coil 12, the condensate passing through the tubular coil 12 to the discharge end of the outlet section 28 of the coil 12. As the condensate fluid passes through the coil 12, is discharged at the open end of the outlet section of the coil, the drops of condensate fluid 40 which lodge between the loop contact 32 and the open of the outlet section 28 of the coil 12, close the circuit between the loop contact 32 and the end plate 30 attached to the open end of the outlet section 28 of the coil.

This causes the current to flow through the moisture sensing circuit 34, which in turn energizes a relay which may be used to activate a dehumidifier to dehumidify the gas or air passing through the system, or shut off a humidifier, in the manner shown in FIGURES 3 and 4, and hereinbefore described.

When the moisture content of the gas, or the humidity of the air is reduced so that the dew point or the point of condensation of the gas or air is lowered, the amount of condensate formed in the tube 11 and the tubular coil 12 is gradually reduced, until the drops 40 of moisture connecting the loop contact 32 with the plate 30 at the end of the outlet section 28 of the coil are evaporated, or otherwise removed.

This leaves the normal gap between the loop contact and the plate attached to the open end of the outlet section 28 of the coil 12, thereby interrupting the flow of current to the moisture sensing circuit and the relay 49 or 54 in the moisture sensing circuits shown in FIGURES 3 and 4. If the moisture content of the gas or the humidity of the air builds up again, condensation will occur and the relay will again be energized in the manner hereinbefore described.

The temperature control circuit may be briefly described as follows:

The purpose of the temperature control circuit 42 shown in FIGURE 1 is to regulate the power supplied to the thermoelectric elements 15 and 16, and so as to maintain the temperature of the gas or air leaving the outlet section 28 of the coil at the desired, preselected temperature, corresponding to the dew point or point of condensation, which is to be maintained in the gas or air being controlled. A thermistor 59, or other type of temperature sensor, hereinafter described, is mounted in the exit air stream beyond the loop contact 32, which is located near the outlet section 28 of the coil. Although the thermistor 59 is ideal as a temperature sensor in this type of application, because of its small size, rapid response and high degree of sensitivity, any other type of temperature sensor, such as a thermo-couple, bimetallic thermometer, or similar device can be substituted therefor. The temperature control circuit is therefore primarily a thermostatic control device appropriate to the temperature sensor, which is capable of maintaining a given preselected temperature within a relatively narrow range.

A thermistor 59 or other type of temperature sensor is mounted adjacent the loop contact 32, opposite the end of the loop contact which is located near the end of the outlet tube 28 and is spaced from the loop contact 32.

A thermistor 59 is a solid state device, the electrical resistance of which varies as the temperature through predetermined temperature ranges.

The thermistor 59 is connected by a pair of conductors 60, 61 to the temperature control circuit. The thermistor 59 and the temperature control circuit 42, to which it is connected serve to establish and maintain the desired temperature of the gas or air passing out of the outlet section 28 of the tubular coil 12, by regulating the current supplied to the thermoelectric elements 15, 16. The temperature of the gas or air may be adjusted to any desired point within the limitations of the capacity of the thermoelectric elements and the heat dissipation system used in conjunction therewith.

FIGURE 2 shows a modification of the construction shown in FIGURE 1.

In this construction, the switching mechanism is substantially the same as that shown in FIGURE 1. The gas or air is circulated through a tubular coil 12, the outlet end 28 of which is located adjacent loop contact 32 which is substantially the same as the loop contact 32 shown in FIGURE 1.

The operation of the apparatus shown in FIGURE 2 is substantially the same as that shown in FIGURE 1, the loop contact 32 being energized by one or more drops of conductive condensate fluid or moisture 40 which lodge between the loop contact 32 and the outlet end 28 of the tubular coil. No end plate 30 is used in the circuit shown in FIGURE 2, the conductor 63 being directly connected to the outlet end 28 of the tubular coil 12. A thermistor 59 is mounted adjacent the end of the loop contact 32 opposite the end which is located near the outlet end 28 of the coil 12. The thermistor 59 which is connected to a temperature control device 42, such as that shown in FIGURE 1, functions in substantially the same manner as that shown in FIGURE 1. The loop contact 32 is connected by a conductor 33 to the moisture sensing circuit 34 as shown in FIGURE 1.

The essential difference between the construction shown in FIGURE 2 and that shown in FIGURE 1, is that the line 63 leading to the water sensing circuit 34 is directly connected to the outlet end 28 of the coil 12, no end plate or wire being used.

The drops 40 of condensate fluid, which flow out of the outlet end 28 of the coil 12 lodge between the loop contact 32 and the open end of the outlet tube 28, thereby closing the switching mechanism which controls the moisture sensing circuit and the relay 49 or 54 in the moisture sensing cricuits shown in FIGURES 3 and 4 in the same manner as that shown in FIGURE 1 and hereinbefore described.

While air is generally specified as the gas used, essentially the same apparatus and method can be used with equal facility for other condensable gases, or gases having a condensable constituent contained therein. Thus the apparatus may be used for control purposes in the process of making ammonia from hydrogen and nitrogen.

The essentials of the apparatus shown in FIGURES 1 and 2 and the moisture sensing circuits shown in FIGURES 3 and 4 and the method of utilizing such apparatus and circuits may be varied to a considerable extent, the fundamentals of the operation remaining substantially the same.

It will thus be apparent that we have provided a simplified device for detecting and controlling the humidity of air or the moisutre content of a gas which depends on cooling the gas or air, condensing a portion of the condensable fluid out of the gas or air and utilizing a portion of the moisture or other conducting condensed fluid as a means of establishing electrical contact with a contact mounted adjacent the discharge end of the tubular coil through which the gas or air is passed thereby to energize a relay which can activate humidification or dehumidification equipment or other type of equipment hereinbefore described, is followed in all of the modifications shown.

In the place of the thermoelectric elements hereinbefore described any type of cooling element may be substituted in order to obtain the desired operating temperature.

Detailed features, such as the shape of the contact, the construction of the cooling element, and the D.C. power supply source may of course be varied considerably, the essentials of the construction and the method of operation of the apparatus remaining substantially the same.

It will be apparent to those skilled in the art that the present invention is not limited to the specific details described above and shown in the drawings and that various modifications are possible in carrying out the features of the invention and the operation, actuation, and the method of control, regulation and utilization thereof, without departing from the spirit and scope of the appended claims.

What is claimed is:

1. An apparatus for detecting the moisture content of gases comprising a downwardly inclined confined passage means for circulating a portion of a gas, the lowest portion of said downwardly inclined confined passage means being open for drainage, gas cooling means mounted to cool the passage means and the gas therein to reduce the dew point of the gas, the moisture condensed traveling along the downwardly inclined confined passage means, an electrical contact mounted near the open lowest portion of the passage means and spaced therefrom to engage a portion of the condensate formed in the passage means prior to its departure therefrom, a moisture sensing means connected to the electrical contact and to the open lowest portion of the passage means activated by condensate lodge between the electrical contact and the open lowest portion of the passage means.

2. An apparatus for detecting and controlling the moisture content of gases, comprising a downwardly inclined confined passage means for circulating a portion of a gas, the lowest portion of said passage means being open for drainage, electrically energized cooling means mounted to cool the passage means and the gas therein to reduce the dewpoint of the gas, the moisture condensed traveling along the downwardly inclined confined passage means, an electrical contact mounted near the lowest portion of the passage means and spaced therefrom to engage a portion of the condensate formed in the passage means prior to its departure therefrom, power supply means electrically connected to energize the cooling means, and moisture sensing means electrically connected to the electrical contact and the open lowest portion of the downwardly inclined confined passage means by means of an amplifier activated by condensate lodge between the electrical contact and the open lowest portion of the passage means adapted to energize a relay.

3. An apparatus for detecting and controlling the moisture content of gases comprising a downwardly inclined tubular passage means for circulating a portion of a gas, the lowest portion of said downwardly inclined tubular gas passage means being open for drainage, a plurality of electrically energized solid state members operative to generate relatively low temperatures mounted externally adjacent the downwardly inclined tubular gas passage means to reduce the temperature of the tubular gas passage means, the reduced temperatures of the downwardly inclined tubular passage means being operative to condense a portion of the condensable constituents in the gas passing through the gas passage means, an electrical contact mounted adjacent the open lowest portion of the downwardly inclined tubular gas passage means and spaced therefrom, a source of energy electrically connected to the solid state members to energize said solid state members, and a moisture sensing circuit electrically connected to the electrical contact and the open lowest portion of the tubular gas passage means, a portion of the condensate formed in the tubular gas passage means being operative to lodge between and form an electrical connection between the electrical contact and the open lowest portion of the tubular gas passage means to thereby energize the moisture sensing circuit.

4. A switching mechanism for use in combination with a moisture content detecting apparatus for gases, said moisture content detecting apparatus comprising a downwardly inclined confined passage means for circulating a portion of a gas, the lowest portion of said gas passage means being open for drainage, gas cooling means mounted to cool said gas through said gas passage means to reduce the dew point of the gas, the moisture condensed traveling along the downwardly inclined confined passage means, said switching mechanism comprising an electrical contact mounted near the open lowest portion of the downwardly inclined confined passage means and spaced therefrom to engage a portion of the condensate formed in the passage means prior to its departure therefrom, the condensate being operative to close an electrical circuit between the electrical contact and the open lowest portion of the downwardly inclined confined passage means to thereby activate the switching mechanism.

5. The method of regulating the moisture content of gases comprising circulating a portion of a gas through a downwardly inclined confined passage having its lowest portion open for drainage, cooling the gas while the gas passes through the downwardly inclined confined passage to reduce the dew point of the gas, channelling the moisture condensed downwardly along the internal surface of the inclined confined passage, establishing an electrical contact by utilizing a portion of the condensate formed in the confined passage as an electrical switch closing means to activate a moisture sensing circuit, and continuing the activation of the moisture sensing circuit until the condensate forming the electrical switch closing means is removed due to a decrease in the moisture content of the gas, thereby breaking the electrical connection.

6. The method of detecting and regulating the moisture content of gases comprising circulating a portion of a gas through a downwardly inclined confined passage having its lowest portion open for drainage, cooling the gas while the gas passes through the downwardly inclined confined passage by means of an electrically energized temperature reduction generating means to reduce the dew point of the gas, channelling the moisture condensed downwardly along the internal surface of the inclined confined passage, establishing electrical contacts at the open lowest portion of the confined passage, utilizing the condensate formed in the confined passage to couple electrically the electrical contacts to activate a moisture sensing circuit, and continuing the activation of the moisture sensing circuit until the condensate forming the electrical switch actuating means is removed due to a decrease in the moisture content of the gas, thereby breaking the electrical connection.

7. The method of detecting and regulating the moisture content of gases comprising circulating a portion of a gas through a downwardly inclined confined passage having its lowest portion open for drainage, cooling the gas while the gas passes through the downwardly inclined confined pasasge by means of an electrically energized temperature reduction generating means to reduce the dew point of the gas, channelling the moisture condensed downwardly along the internal generating means along the internal surface of the inclined confined passage, sensing and maintaining the temperature of the gas at a predetermined level, establishing electrical contact at the open lowest portion of the confined passage, utilizing the condensate formed in the confined passage to couple electrically the electrical contacts to activate a moisture sensing circuit, and keeping the moisture sensing circuit activated until the condensate forming the electrical coupling between the electrical contacts is removed, due to a decrease in the moisture content of the gas, thereby breaking the electrical connection to the moisture sensing circuit.

8. An apparatus for detecting and controlling the moisture content of gases comprising a downwardly inclined tubular passage means for circulating a portion of a gas, the lowest portion of said downwardly inclined tubular passage means being open for drainage, a plurality of electrically energized temperature control members mounted externally adjacent the downwardly inclined tubular passage means, each of said temperature control members being operative to release heat at one face thereof, and absorb heat from the opposite face thereof to reduce the temperature of the gas through said downwardly inclined passage means to a predetermined level, means bonded to the face of each of said temperature control members opposite the heat absorbent face thereof operative to dissipate the heat released by the temperature control members, the heat abstracted by said temperature control members being operative to condense a portion of the moisture in the gas passing through the tubular passage means when the dew point of the gas is reached, an electrical contact mounted near the open lowest portion of the downwardly inclined tubular passage means and spaced therefrom, a moisture sensing circuit electrically connected to the electrical contact and the open lowest portion of the tubular passage means, and a source of energy coupled electrically to energize said temperature control members, a portion of the condensate from the tubular passage means being operative to form an electrical connection between the electrical contact and the open lowest portion of the tubular passage means to thereby energize the electrical control mechanism.

9. An apparatus for detecting the moisture content of gases comprising a downwardly inclined tubular passage means for circulating a portion of a gas, the lowest portion of said downwardly inclined tubular passage means being open for drainage, a plurality of electrically energized temperature control members mounted externally adjacent the downwardly inclined tubular passage means, each of said temperature control members being operative to release heat at one face thereof, and absorb heat from a surface adjoining the opposite face thereof, means fixedly attached to the face of each of said temperature control members opposite the heat absorbent face thereof to dissipate the heat released by the temperature control members, the heat dissipating means having a plurality of heat conducting elements integral therewith, the heat abstracted by said temperature control members being operative to condense a portion of the moisture in the gas passing through the downwardly inclined tubular passage means, an electrical contact mounted adjacent the open lowest portion of the downwardly inclined tubular passage means and spaced therefrom, and a source of energy coupled electrically to energize said temperature control members, a portion of the condensate from the downwardly inclined tubular passage means being operative to form an electrical connection between the electrical contact and the open lowest portion of the tubular passage means, the portion of the condensate serving as a switching member.

10. An apparatus for detecting and controlling the moisture content of gases comprising a downwardly inclined confined passage means for circulating a portion of a gas, the lowest portion of said downwardly inclined confined passage means being open for drainage, electrically energized cooling means mounted externally adjacent said downwardly inclined gas passage means, said cooling means being operative to reduce the dew point of the gas through said downwardly inclined gas passage means, the moisture traveling along the downwardly inclined confined passage means, an electrical contact mounted near the open lowest portion of the downwardly inclined confined passage means and spaced therefrom to engage a portion of the condensate formed in the passage means prior to its departure therefrom, power supply means electrically connected to energize the cooling means, and a moisture sensing circuit electrically connected to the electrical contact and the open lowest portion of the downwardly inclined confined passage means, said moisture sensing circuit including an amplifier electrically connected to the electrical contacts mounted near and to the open lowest portion of the downwardly inclined confined passage means, a relay actuated by the signal from the amplifier, and humidity regulating means electrically connected to the relay and controlled thereby, a portion of the condensate formed in the gas passage means and engaged by said electrical contact forming an electrical connection between the electrical contact and the open lowest portion of the downwardly inclined confined passage means to energize the relay of the moisture sensing circuit.

11. An apparatus for detecting and controlling the moisture content of gases, comprising a downwardly inclined confined passage means for circulating a portion of the gas, the lowest portion of said downwardly inclined confined passage means being open for drainage, electrically energized cooling means mounted externally adjacent said downwardly inclined passage means, said cooling means being operative to reduce the dew point of the gas through said downwardly inclined gas passage means, the moisture condensed traveling along the downwardly inclined confined passage means, an electrical contact mounted near the open lowest portion of the downwardly inclined confined passage means and spaced therefrom to engage a portion of the condensate formed in the passage means prior to its departure therefrom, power supply means electrically connected to energize the cooling means, a moisture sensing circuit electrically connected to the electrical contact and the open lowest portion end of the downwardly inclined confined passage means, said moisture sensing circuit including a transistor amplifier electrically connected to the electrical contact mounted near the open lowest portion of the downwardly inclined confined passage means, a relay actuated by the signal from the transistor amplifier, and humidity regulating means electrically connected to the relay and controlled thereby, a portion of the condensate formed in the downwardly inclined confined passage means and engaged by said electrical contact forming an electrical connection between the electrical contact and the open lowest portion of the downwardly inclined confined passage means to energize the relay of the moisture sensing circuit.

12. An apparatus for detecting and controlling the moisture content of gases comprising a downwardly inclined tubular passage means for circulating a portion of the gas, the lowest portion of said downwardly inclined tubular passage means being open for drainage, a plurality of electrically energized solid state members operative to generate relatively low temperatures mounted externally adacent said downwardly inclined tubular passage means, said cooling means being operative to reduce the dew point of the gas through said downwardly inclined tubular passage means, an electrical contact mounted adjacent the open lowest portion of the downwardly inclined tubular passage means and spaced therefrom to engage a portion of the condensate formed in the downwardly inclined tubular passage means prior to its departure therefrom, power supply means electrically connected to energize said solid state members, and a moisture sensing circuit electrically connected to the electrical contact and the open lowest portion of the downwardly inclined tubular passage means, said moisture sensing circuit including amplifier means electrically connected to the electrical contact mounted near and to the lowest portion of the downwardly inclined tubular passage means, a relay actuated by the signal from the amplifier means, and humidity regulating means electrically connected to the relay and controlled thereby, a portion of the condensate formed in the downwardly inclined tubular passage means and engaged by said electrical contact forming an electrical connection between the electrical contact and the open lowest portion of the downwardly inclined tubular passage means to energize the relay of the moisture sensing circuit.

13. An apparatus for detecting and controlling the moisture content of gases comprising a downwardly inclined tubular passage means for circulating a portion of the gas, the lowest portion of said downwardly inclined tubular passage means being open for drainage, a plurality of electrically energized solid state members operative to generate relatively low temperatures mounted externally adjacent the downwardly inclined tubular passage means to reduce the temperature of the downwardly inclined tubular passage means, said solid state members being operative to reduce the dew point of the gas through said downwardly inclined tubular passage means, the moisture condensed traveling along the downwardly inclined tubular passage means, an open electrical contact mounted adjacent the open lowest portion of the downwardly inclined tubular passage means and spaced therefrom to engage a portion of the condensate formed in the downwardly inclined tubular passage means prior to its departure therefrom, temperature sensing means mounted adjacent the electrical contact, and temperature control means electrically connected to the temperature sensing means, said temperature control means being operative to maintain the temperature of the gas at a predetermined level by controlling the power supplied to the electrically energized solid state members, a source of energy to energize said solid state members, and a moisture sensing circuit electrically connected to the electrical contact and the open lowest portion of the downwardly inclined tubular passage means, a portion of the condensate formed in the downwardly inclined tubular passage means and engaged by said electrical contact forming an electrical connection between the electrical contact and the open lowest portion of the downwardly inclined tubular passage means to energize the moisture sensing circuit.

14. An apparatus for detecting and controlling the moisture content of gases comprising a downwardly inclined confined passage means for circulating a portion of the gas, the lowest portion of said downwardly inclined passage means being open for drainage, electrically energized cooling means mounted in close external engagement with said downwardly inclined means to reduce the temperature of the gas in said downwardly inclined confined passage means, the moisture condensed traveling along the downwardly inclined passage means, an open electrical contact mounted near the open lowest portion of the downwardly inclined confined passage means and spaced therefrom to engage a portion of the condensate formed in the downwardly inclined confined passage means prior to its departure therefrom, a temperature sensing element located near the open lowest portion of the downwardly inclined confined passage means, and temperature control means electrically connected to the temperature sensing element, said temperature control means being operative to maintain the temperature of the gas passing through the downwardly inclined confined passage means at a predetermined level by controlling the power supplied to the electrically energized cooling means, a source of energy connected to energize the cooling means, a moisture sensing circuit electrically connected to the electrical contact and the open lowest portion of the downwardly inclined confined passage means, said moisture sensing element including an amplifier electrically connected to the electrical contact mounted near and to the lowest portion of the downwardly inclined confined passage means, a relay actuated by the signal from the amplifier, and humidity regulating means electrically connected to the relay, and controlled thereby, a portion of the condensate formed in the downwardly inclined confined passage means and engaged by said electrical contact forming an electrical connection between the electrical contact and the open lowest portion of the downwardly inclined confined passage means to energize the relay of the moisture sensing circuit.

15. An apparatus for detecting the moisture content of gases comprising a downwardly inclined tubular passage means for circulating a portion of the gas, the lowest portion of said downwardly inclined tubular passage means being open for drainage, a plurality of electrically energized temperature control members mounted adjacent to the downwardly inclined tubular passage means, each of said temperature control members being operative to release heat at one face thereof, and absorb heat from a surface adjoining the opposite face thereof, a heat sink fixedly attached to the face of each of said temperature control members, opposite the heat absorbent face thereof, each of said heat sinks having a plurality of fins integral therewith, the fins projecting outward relative to the heat sinks, the heat sinks and the fins integral therewith being operative to dissipate the heat released by the temperature control members by radiating heat to the gaseous medium surrounding the apparatus, the heat abstracted by said temperature control members being operative to reduce the temperature of the gas in said downwardly inclined tubular passage means to condense a portion of the moisture in the gas, the moisture condensed traveling along the downwardly inclined tubular passage means, an electrical contact mounted near the open lowest portion of the tubular passage means and spaced therefrom to engage a portion of the condensate formed in the downwardly inclined tubular passage means prior to its departure therefrom, and a source of energy electrically connected to energize said temperature control members, a portion of the condensate from the downwardly inclined tubular passage means being operative to form an electrical connection between the electrical contact and the open lowest portion of the downwardly inclined tubular passage means, the portion of the condensate energized by the electrical contact serving as a switching member.

References Cited by the Examiner
UNITED STATES PATENTS

| | | |
|---|---|---|
| 1,548,366 | 8/25 | Johnson. |
| 1,960,658 | 5/34 | Brace _____ 236—44 |
| 2,217,626 | 10/40 | Strang et al. |
| 2,435,895 | 2/48 | McIlvaine _____ 73—17 |
| 2,468,691 | 4/49 | Smith _____ 236—44 |
| 2,979,950 | 4/61 | Leone. |
| 3,027,725 | 4/62 | Harvey _____ 62—3 |
| 3,031,855 | 5/62 | Martz _____ 62—3 |
| 3,110,442 | 11/63 | Taylor _____ 236—44 |

EDWARD J. MICHAEL, *Primary Examiner.*

ALDEN D. STEWART, *Examiner.*